Jan. 24, 1961 R. SCHÖN 2,969,117
CYCLIC PITCH CONTROL SYSTEM FOR ROTORS OF HELICOPTER AIRCRAFT
Filed Feb. 25, 1957 2 Sheets-Sheet 1

INVENTOR.
Richard Schön
BY

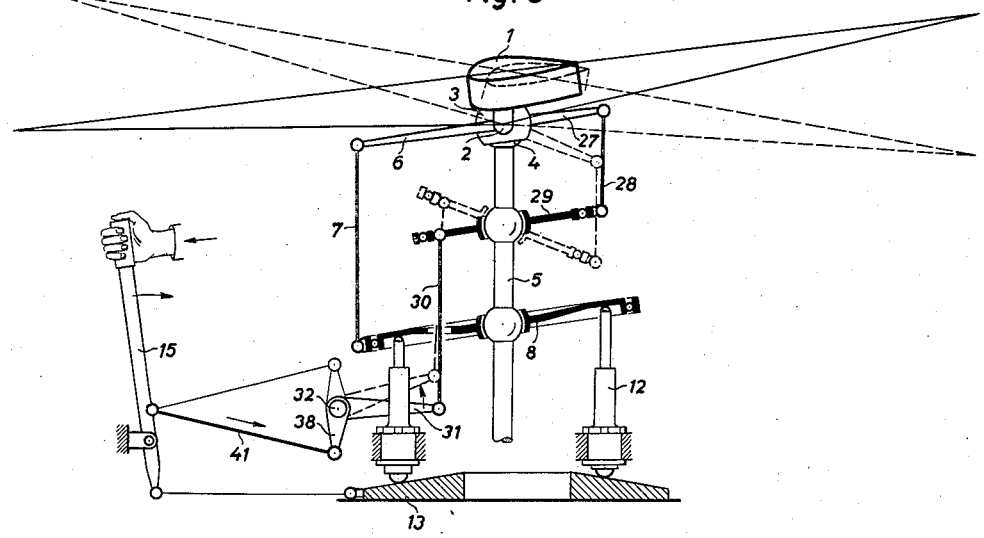
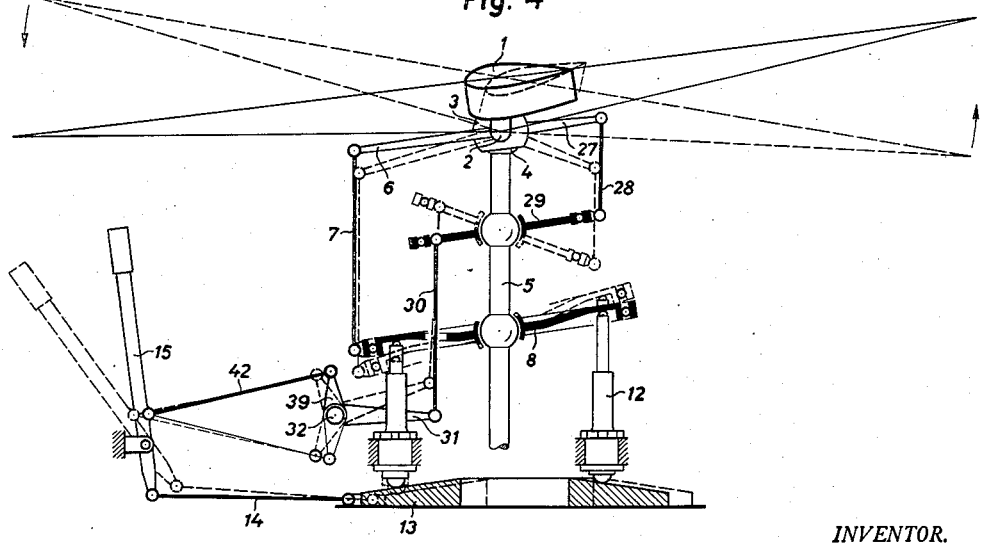

United States Patent Office 2,969,117
Patented Jan. 24, 1961

2,969,117

CYCLIC PITCH CONTROL SYSTEM FOR ROTORS OF HELICOPTER AIRCRAFT

Richard Schön, Prague, Czechoslovakia, assignor to Výzkumný a zkušební letecký ústav, Letnany, near Prague, Czechoslovakia Filed Feb. 25, 1957, Ser. No. 642,193

6 Claims. (Cl. 170—160.25)

The present invention relates to improvements in the cyclic pitch-control of the main rotor of helicopter aircraft whereby vibrating forces originated by the rotor blades are prevented from being transmitted to the pilot's control lever and simultaneously a force is provided which acts upon the control lever and replaces the effect of aerodynamic forces which act on the rotor.

A swash plate is, at the present time, the most commonly used device for transmitting the cyclic pitch-control to the rotor blades. As this swash plate is connected to the rotor blades which undergo a cyclic pitch change during each revolution of the rotor, the vibrations from the rotor blades are transmitted to the control means. It is impossible to compensate fully for these vibrations under all flying conditions. As a consequence thereof, the pilot always feels vibrating forces in the control lever which are tiresome and which do not allow him to release the control lever even for a short moment. Any release of the control lever means instantaneously results in unstable flying conditions, where damages to the rotor blades or eventually to the whole aircraft may occur, and the safety of the crew may be endangered. Larger helicopters are for this reason provided with hydraulic boosters, but such boosters are expensive and do not work wholly satisfactorily.

The vibrating forces acting upon the pilot's control lever do not provide the pilot with any sensible impulse, enabling him to judge correctly the position of the aircraft and its course. This is a serious disadvantage of helicopter control as compared with the control of aircraft with fixed wings. In fixed-wing aircraft the pilot feels in the control lever the forces due to the aerodynamic loading upon the control surfaces, and may react directly by a movement of his control lever in accordance with the direction and magnitude of these forces, to maintain the required course. The above mentioned forces from the control surfaces are as a rule stable or continuously variable. These forces are of an entirely different character than the above mentioned vibrating forces reacting upon the pilot's control lever from the cyclic pitch-control system of a helicopter aircraft.

In order to at least partially eliminate these rather inconvenient forces in the cyclic pitch control of helicopters and to give to the pilot the sensation of resistant forces in the control means, different devices have been inserted into the mechanism of the cyclic control. Such devices may comprise a system of springs which produce a resistant force during a deflection of the pilot's control lever, to replace the forces derived from the rotor and which is similar to the force experienced when steering a fixed wing aircraft with control surfaces. Other existing devices comprise a system of small flywheels, acting by their moment of inertia to supply the desired resistant force in response to displacement of the control lever. These solutions are however not satisfactory, as the equivalent forces do not correspond fully to the real flying conditions.

Accordingly, it is an object of the invention to provide a control system for helicopters which prevents the transmission to the pilot's control lever of the vibrations originating in the cyclic pitch control, and further to provide resistive forces acting on the control lever in response to displacement of the latter, which forces accurately correspond to the actual flying conditions of the helicopter so that such flying conditions can be sensed by the pilot through the control lever.

According to an aspect of the invention, an intermediate member is introduced into the swash plate arrangement of the cyclic pitch control system and has a self-locking characteristic preventing the transmission of any forces from the rotor to the control lever, and further, resilient means are connected with the control lever and respond to inclination of the plane of the main or sustaining rotor with respect to other structure of the helicopter in order to provide the desired resistive forces acting upon the control lever and corresponding to the flight conditions.

The above, and other objects, features and advantages of the invention, will be apparent in the following detailed description of illustrative embodiments thereof, which is to be read in connection with the accompanying drawings forming a part hereof and wherein:

Figs. 3 and 4 are diagrammatic views illustrating the operation of the control system embodying the invention under different flight conditions.

Figure 1:
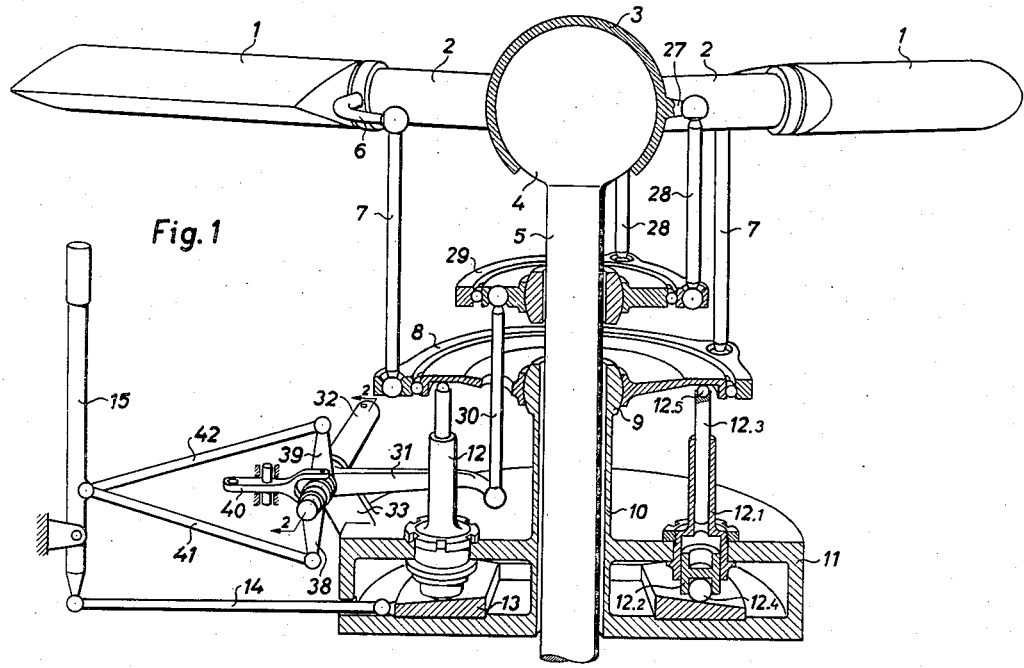
Fig. 1 is a perspective view, partly broken away and in section, of the cyclic pitch control and rotor of a helicopter in accordance with the present invention, but showing only the control elements for forward flight while the control elements for lateral movement of the helicopter are eliminated from the view merely for the purpose of clarity.

Referring to the drawings in detail, and initially to Fig. 1 thereof, it will be seen that the main or sustaining rotor of a helicopter embodying the invention includes the usual blades 1 which are suspended, by butt arms 2, on an outer part 3 of the rotor head. The outer part 3 of the rotor head is mounted on a central part 4 of the rotor head which is carried at the upper end of the rotor shaft 5. The parts 3 and 4 of the rotor head combine to form a universal joint, which permits tilting of the plane of the rotor with respect to the plane perpendicular to the axis of shaft 5. The usual lever arm 6 extends from each butt arm 2 and is connected, by a rod 7, with the race ring of a swash plate 8 forming a portion of the cyclic pitch control. The swash plate 8 it tiltable on a spherical bearing 9 carried by a post 10 which extends rigidly from a housing 11 so that, when the swash plate 8 is tilted, the rods 7 and lever arms 6 will effect corresponding adjustment of the pitch of each blade 1.

In order to effect tilling of the swash plate 8, braces which are generally identified by the reference numeral 12 are carried by the top wall of the housing 11 and engage, at their upper ends, against the lower surface of the non-rotatable central part of the swash plate and, at their lower ends, against the inclined surfaces of a guide member in the shape of a rectangular truncated pyramid 13 which is slidable on the base or bottom wall of the housing 11.

The cyclic pitch control includes four of the braces 12 arranged symmetrically about the axis of shaft 5 and, in Fig. 1, only two of the braces are illustrated and correspond to the control of forward flight, but it is to be understood that two additional braces, which are eliminated merely for the purpose of clarity, are arranged with their axes lying in a plane at right angles to the plane containing the axes of the illustrated braces for the purpose of controlling flight in the lateral direction.

The truncated pyramid 13 is low and its side walls are inclined, at a small angle, with respect to the base so that the tangents of this small angle are equal, or approximately equal, to the coefficient of friction between the lower ends of the braces 12 and the side wall surfaces of the pyramid 13. The pyramid 13 is slidably displaced within the housing 11 by a rod 14 which is, in turn, pivotally connected to the pilot's control lever 15. The illustrated rod 14 is for the purpose of effecting the control movements of the pyramid 13 in the directions for regulating forward flight of the helicopter, and it is to be understood that a similar control arrangement is provided for effecting lateral movements of the pyramid 13 in connection with the control of lateral flight.

The sliding movement of the pyramid 13 on the base or bottom wall of the housing 11 effects corresponding vertical movements of the braces 12. Thus, as one of the braces 12 moves up the inclined surface of the pyramid 13 and is displaced vertically upward against the swash plate 8, the latter is made to tilt and bears downwardly upon the other brace 12 which is moving downwardly on the related inclined surface of the pyramid 13. During forward and rearward movement of the pyramid 13, only the braces 13 corresponding to the control of forward flight are vertically displaced, while the other two braces (not illustrated) which correspond to the control of lateral flight, remain vertically stationary. Similarly, when the pyramid 13 is only moved laterally, the braces 12 corresponding to the control of lateral flight are moved vertically in opposite directions, while the braces 12 illustrated in Fig. 1 and corresponding to the control of forward flight remain vertically stationary. On the other hand, when the pyramid 13 is moved both in the lateral and longitudinal directions, all four braces 12 are suitably displaced in the vertical direction to achieve the necessary tilting of the swash plate.

However, when the forces from the rotor blades 1 react upon swash plate 8 and tend to tilt the latter around its bearing 9, and thereby tend to force one or more of the braces 12 downwardly against the pyramid 13, the downward force applied against the inclined surface or surfaces of the pyramid cannot effect sliding movement of the latter and the corresponding transmission of forces to the control lever 15 by reason of the fact that the angle included between each inclined surface of pyramid 13 and the base of the latter has a tangent which is equal, or substantially equal, to the coefficient of friction between the lower end of each brace 12 and the related surface of the pyramid. Thus, forces cannot be transmitted from the rotor blades back to the control lever 15.

When the rotor head is mounted on a tiltable joint, as in the embodiment of the invention illustrated in Fig. 1, the cyclic pitch control of each blade 1 requires a substantial stroke of the related rod 7 and a correspondingly large tilting of the swash plate 8. Such large tilting displacement of the swash plate 8 requires that each of the braces 12 have a relatively large displacement at its upper end, but the vertical movements at the lower end of each brace 12 should be as small as possible in order to avoid the necessity for excessive dimensions of the pyramid 13. Assuming a certain coefficient of friction between the lower end of each brace 12 and the related inclined surface of the pyramid 13, and thus, a specific angle of inclination of the side walls of the pyramid, it is apparent that the dimensions of the latter will be dictated by the extent of the vertical movement required at the lower end of each brace 12. In order to provide a relatively large stroke at the upper end of each brace 12 in response to a relatively small movement at the lower end of the brace, each brace 12 may be in the form of an hydraulic unit including a differential cylinder 12.1 secured to the upper wall of housing 11 and having a relatively large diameter lower portion receiving a lower piston 12.2 carrying a rotatable steel ball 12.4 in contact with the related inclined surface or side wall of pyramid 13, and a relatively small diameter upper portion slidably receiving an upper piston or plunger 12.3 which, at its upper end, carries a rotatable steel ball 12.5 engageable with the underside of the non-rotatable central portion of swash plate 8. It is apparent that, when hydraulic fluid fills the interior of the differential cylinder 12.1 between the pistons 12.2 and 12.3, a relatively small vertical movement of the large piston 12.2 will produce a relatively large vertical movement of the upper piston or plunger 12.3.

Although the specifically described brace 12 has a steel ball 12.4 in rolling contact with the related surface of the pyramid 13, thereby reducing the frictional resistance to control movements of the pyramid 13 by the pilot, it is to be understood that the friction between each ball 12.4 and the inclined surface of the pyramid 13 is still sufficiently large as to retain the irreversible character of the transmission of forces from the pyramid to the braces, that is, to prevent the transmission of forces from the rotor blades back to the control lever 15.

It will be apparent that in the above described embodiment of the invention, the cyclic pitch control system can transmit control forces only in the direction from the pilot's control lever to the swash plate, and that forces in the reverse direction cannot be transmitted. Thus, vibrating forces resulting from the cyclic pitch control are isolated from the pilot's control lever 15, thereby to increase the comfort and ease with which the helicopter can be handled. In order to provide forces acting in the control lever and corresponding to the aerodynamic influence of the rotor on the helicopter, the present invention provides a resilient system in combination with the cyclic pitch control.

Referring again to Fig. 1, it will be seen that a suitable arrangement embodying the invention for simulating the effect of the aerodynamic forces upon the control lever 15 includes two arms 27 projecting from the outer part 3 of the rotor head and which remain in the plane of the latter as the latter tilts with respect to the shaft 5. The two arms 27 are angularly spaced apart by an angle of from 60 to 120° and are connected, by rods 28, with an auxiliary swash plate 29 which is tiltable about a bearing on the shaft 5. The swash plate 29 serves to indicate the position of the plane of the rotor and its tilting center is at a constant distance from the tilting center of the rotor defined by the ball and socket or universal joint 3, 4 of the rotor head.

The swash plate 29 includes a central, non-rotatable part to which two pull rods 30 are pivotally connected. The two pull rods 30 respectively correspond to the cyclic control in the longitudinal and lateral directions and each is connected to a related resilient system. The pull rods 30 lie in planes which pass through the axis of the shaft 5 and which are angularly displaced through 90° with respect to each other. Fig. 1 only illustrates the pull rod 30 corresponding to the cyclic control in the longitudinal direction.

The elastic system associated with each of the pull rods 30 includes a lever 31 which is securely connected to a spring 32.

Figure 2:
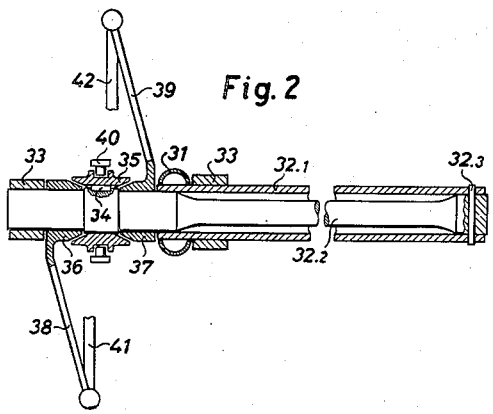
Fig. 2 is an enlarged sectional view of the resilient means for providing resistive forces on the control lever in the control system of Fig. 1.

As shown in Figs. 1 and 2, the spring generally identified by the reference numeral 32 includes a tube 32.1 having one end freely rotatable on a torsion rod 32.2, while the opposite end of the tube 32.1 is connected with the torsion rod by a bolt 32.3. The torsion spring assembly 32 is rotatably supported in bearings 33 carried by housing 11. A cone friction clutch is associated with the spring assembly 32 and includes an axially slidable member 35 guided on the torsion rod 32.2 by means of a key 34 and having frusto conical opposite ends which are engageable with outer cones 36 and 37 rotatable on the rod 32.2. The outer cones 36 and 37 have lever arms 38 and 39, respectively, extending therefrom, and the free ends of the lever arms 38 and 39 are connected, by rods 41 and 42, respectively, to a common point on the control lever 15. The slidable member 35 of the clutch is movable axially for engagement with either the cone 36 or the cone 37 by a hand operated lever 40.

The lever arms 38 and 39 are directed downwardly and upwardly, respectively, from the axis of the torsional spring 32 so that, by displacing the sliding member 35 of the clutch in one direction or the other, the action of the force of the torsional spring 32 on the control lever 15 can be in one direction or the other when the lever 31 moves in one direction. When the hand operated lever 40 is in a neutral position, the slidable member 35 of the clutch is disengaged from both outer cones 36 and 37 so that the clutch is disengaged and the torsional spring 32 does not interfere with the cyclic control system.

When the pilot shifts the lever 40 during balanced flight in order to engage the slidable member 35 of the clutch with the outer cone 36 of the latter so that the torsional spring is then interposed in the mechanical system between swash plate 29 and the control lever 15 by way of the lever arm 38 and rod 41, such connection of the elastic or resilient system provides a resistance to displacement of the control lever 15 which is similar to that encountered in a fixed wing aircraft by reason of the aerodynamic forces acting upon the elevator.

Fig. 3 of the drawings represents the situation during forward flight of the helicopter, during which the rotor plane is forwardly inclined, as illustrated in full lines. If the rotor plane is tilted back by some outside influence, as represented by the broken lines on Fig. 3, such rearwardly tilted position of the rotor plane is indicated by the swash plate 29. The corresponding tilting of the swash plate 29 deforms the torsional spring 32 and transmits a pull to the stick or control lever 15 by way of the lever arm 38 and the rod 41. Since the pilot feels this force reacting on the control lever 15, he instinctively reacts thereto and suitably displaces the control lever to return the plane of the rotor to its original position. As the rotor returns to its original position, as shown in full lines on Fig. 3, the spring force acting on the control lever 15 decreases, and the pilot instinctively decreases the control force that he exerts upon the control lever.

If, during balanced flight, the slidable member 35 of the clutch is displaced from its central neutral position in the direction for engagement with the outer cone 37, so that the torsional spring 32 is interposed between the swash plate 29 and the control lever 15 by way of the lever arm 39 and the rod 42, then the forces exerted upon the control lever 15 in response to tilting of the plane of the rotor will be the reverse of those described with reference to Fig. 3. Thus, as shown in Fig. 4, when the torsional spring 32 is connected to the control lever 15 by way of the lever arm 39 and the rod 42, tilting of the plane of the rotor from the full line position rearwardly to the broken line position of Fig. 4 will give rise to a resilient force acting on the control lever 15 in the direction for moving the latter from the full line position of Fig. 4 to the broken line position. Hence, the force transmitted by the rod 42 tends to displace the control lever in the direction from the broken line position to the full line position of Fig. 4, thereby to return the plane of the rotor to its original position.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What I claim is:

1. A cyclic pitch control system for helicopters comprising a support, a rotor shaft journaled in said support, a rotor including a rotor head mounted on said shaft and blades suspended from said head and turnable about their longitudinal axes with respect to said head for varying the pitch of the blades, a swash plate tiltably mounted on said support, mechanical elements connected between said swash plate and sadi blades for varying the pitch of the latter in response to tilting of said swash plate, a face portion of said support extending in a plane perpendicular to the axis of said rotor shaft, at least one guide member slidable on said face portion and having inclined surfaces at a small angle with respect to said plane; means for moving said guide member relative to said rotor shaft in directions parallel to said plane; and transmission members mounted on said support and movable thereon substantially parallel to said axis of the rotor shaft, said transmission members engaging said inclined surfaces of the guide member and said swash plate, respectively, to tilt the latter in response to movement of said guide member relative to said rotor shaft, said small angle between said inclined surfaces and the plane of said face portion having tangents approximately equal to the coefficient of friction between said inclined surfaces and said transmission members so that said guide member cannot be moved by forces from said swash plate transmitted parallel to said rotor shaft by said transmission members.

2. A cyclic pitch control system for helicopters as in claim 1; wherein said guide member is in the form of a truncated pyramid having four inclined surfaces a pair of which correspond to the control of flight in the longitudinal direction and the other pair of which correspond to the control of flight in the lateral direction; and wherein said transmission members are four support braces extending parallel to said rotor shaft, each of said braces having its lower end in sliding engagement with a related one of said surfaces of the pyramid and its upper end in sliding engagement with said swash plate.

3. A cyclic pitch control system for helicopters, comprising a rotor shaft; a rotor including a rotor head tiltably mounted on said shaft, and blades suspended from said head and turnable about their longitudinal axes with respect to said head for varying the pitch of the blades; a swash plate tiltably mounted on said shaft; mechanical elements connected between said swash plates and said blades for varying the pitch of the latter in response to tilting of said swash plate; a base plate in a plane perpendicular to the axis of said rotor shaft; a guide member slidable on said base plate, said guide member being in the form of a truncated pyramid having four inclined surfaces at a small angle with respect to said plane of the base plate, a pair of said surfaces corresponding to the control of flight in the longitudinal direction and the other pair of said surfaces corresponding to the control of flight in the lateral direction; means for moving said guide member relative to said rotor shaft in directions parallel to said plane of the base plate, said means including a control lever; four support braces extending parallel to said rotor shaft and movable substantially parallel to the axis thereof, each of said braces having its lower end in sliding engagement with a related one of said surfaces of the pyramid and its upper end in sliding engagement with said swash plate to tilt the latter in response to movement of said guide member relative to said rotor shaft, said small angle between said inclined surfaces and the plane of the base plate having tangents approximately equal to the coefficient of friction between said inclined surfaces and said braces so that said guide member cannot be moved by forces from said swash plate transmitted parallel to said rotor shaft by said braces; an elastic system; means for deforming said elastic system in response to deviations of the plane of said rotor from the plane coresponding to the position of said control lever; and means for transmitting to said control lever the force resulting from deformation of said elastic system.

4. A cyclic pitch control system for helicopters as in claim 3; wherein said means for transmitting to said control lever the force resulting from deformation of said elastic system includes two oppositely directed lever arms, rods connecting said arms to a common point on said control lever so that the latter is urged in opposite directions in response to turning of said lever arms in the same direction, and clutch means for selectively coupling one of said lever arms to said elastic system.

5. In a pitch control system for helicopters, in combination, a support; a rotor shaft journaled in said support for rotation; a rotor blade mounted on said shaft for rotation therewith, said blade being pivotable relative to said shaft about a transversely extending axis, said axis defining a rotor plane during rotation of said rotor blade; and control means for actuating the pivoting movement of said blade, said control means including a guide member reciprocably movable on said support in a predetermined path, a guide face on said member defining a small acute angle with said path, a transmission member mounted on said support for reciprocating movement in a direction substantially perpendicular to said guide face and to said path, a contact portion of said transmission member being in abutting contact with said guide face, and connecting means operatively connected to said transmission member and to said blade for pivoting movement of said blade responsive to the reciprocating movement of said transmission member, said angle being not substantially greater than the friction angle of said contact portion of said guide face.

6. In a pitch control system for helicopters as in claim 5; means for moving said guide member including a control lever; an elastic system; means for deforming said elastic system in response to deviations of said rotor plane from a predetermined plane, and means for transmitting to said control lever the force resulting from deformation of said elastic system.

References Cited in the file of this patent

UNITED STATES PATENTS

| | | |
|---|---|---|
| 2,256,918 | Young | Sept. 23, 1941 |
| 2,394,846 | Cox | Feb. 12, 1946 |
| 2,486,059 | Pentecost | Oct. 25, 1949 |
| 2,529,479 | Bates | Nov. 14, 1950 |
| 2,689,616 | Nagler | Sept. 21, 1954 |
| 2,748,876 | Daland et al. | June 5, 1956 |
| 2,755,870 | Gerstenberger | July 24, 1956 |

FOREIGN PATENTS

| | | |
|---|---|---|
| 572,081 | Great Britain | Sept. 21, 1945 |